United States Patent
Cook

[15] 3,664,904
[45] May 23, 1972

[54] SELF-SEALING STRUCTURE FOR USE AS A FLUID BARRIER IN CONTAINERS

[72] Inventor: Richard L. Cook, Flagstaff, Ariz.
[73] Assignee: Marshall Industries, San Marino, Calif.
[22] Filed: Mar. 4, 1970
[21] Appl. No.: 16,471

[52] U.S. Cl. ............................... 161/50, 150/0.5, 161/243, 161/405, 220/63, 220/83
[51] Int. Cl. ................................... B32b 3/06, B65d 37/00
[58] Field of Search ................. 161/52, 405, 243, 247, 560, 161/57, 227; 220/63, 63 A, 83; 150/0.5

[56] References Cited

UNITED STATES PATENTS

| | | | |
|---|---|---|---|
| 2,626,882 | 1/1953 | Gerke | 161/405 X |
| 2,802,763 | 8/1957 | Freedlander | 161/405 X |
| 2,416,231 | 2/1947 | Smith et al. | 161/405 X |
| 3,146,799 | 9/1964 | Fekete | 161/206 X |
| 2,446,815 | 8/1948 | Davies et al. | 161/57 |
| 3,058,859 | 10/1962 | Amberg | 161/243 |

FOREIGN PATENTS OR APPLICATIONS 569,854  6/1945  Great Britain ..................... 161/50

*Primary Examiner*—Philip Dier
*Attorney*—Fulwider, Patton, Rieber, Lee & Utecht

[57] ABSTRACT

A self-sealing structure adapted for use in a container or the like as a fluid barrier. The structure comprises sealant material adapted to swell in the presence of certain fluids and is interposed between inner and outer layers, at least one of the layers being resiliently expansible to accommodate such swelling. Tension means extending between the layers limit the amount of expansion. In one embodiment the inner layer is pervious to the contained fluid, and the contained fluid is one which swells the sealant material. The swelled sealant material and the resilient layer or layers develop an internal pressure which tends to urge the sealant material toward any puncture of the structure. In another embodiment, the sealant material is caused to swell by exposure thereof to a swelling agent other than the contained fluid.

23 Claims, 5 Drawing Figures

Patented May 23, 1972

3,664,904

INVENTOR.
RICHARD L. COOK
BY Fulwider, Patton, Rieber,
Lee and Utecht
ATTORNEYS

SELF-SEALING STRUCTURE FOR USE AS A FLUID BARRIER IN CONTAINERS

BACKGROUND OF THE INVENTION

1. Field of the Invention

The present invention relates to self-sealing structures utilizing relatively viscous materials to effect plugging and sealing of punctures or leaks occuring in the structures.

2. Description of The Prior Art

The present invention has broad application to self-sealing of many different types of structures, including containers, conduits, or pressure vessels for various types of fluids. The invention has particular application to self-sealing of fuel cells for aircraft and the like.

Prior art self-sealing aircraft fuel cells are characterized by multi-ply walls which are designed to prevent any penetration thereof by the contained fluid. The innermost layer in contact with the fuel is purposely selected for imperviousness or impermeability to the fuel and its solvent action. This inner layer is commonly made of a combination of a nylon barrier film and a solvent resistant nitrile or similar synthetic rubber. The outer covering or layer of the prior art fuel cell is usually made of tough, vulcanized rubber, leather or similar high-strength material, the number and types of layers or plies in the fuel cell varying according to the strength and weight requirements of the particular application. The sealant material for such a tank usually comprises one or more plies or layers of gum latex or raw rubber located between the inner and outer layers. The latex has a capacity for rapid swelling in the presence of aircraft fuel and similar hydrocarbons. Thus, if the fuel cell suffers a puncture or perforation, the raw fuel in the cell comes into contact with the latex, and the latex swells in the confined area within which it is located, but without any significant oozing or flowing of the latex into the wound area. Consequently, if the puncture producing agent removes any of the latex material, such as a projectile often does, effective sealing of the puncture is generally not achieved.

Although the swell rate of latex or raw rubber in the presence of hydrocarbons is relatively high, the only portion of the latex which is softened or plasticized by the fuel is that in the immediate area of the puncture. Consequently, those areas of sealant material remote from the puncture location are inoperative to seal the puncture, and the capacity of the sealant material for lateral flow or movement into the wound area is limited to the sealant material surrounding the puncture. For large punctures, such as might be caused by yawed bullets or large fragments of projectiles and the like, effective sealing could only be accomplished by increasing the thickness of the latex layer, thereby providing a greater quantity of latex around any potential wound area. Unfortunately, this provided an undesirably heavy fuel cell. In addition, even though the latex layer was thicker in the area of a large puncture, the time required for the latex to swell and flow into the wound was such that appreciable fuel leakage occurred before sealing was achieved. Not only does the leaking fuel present a serious fire hazard, but it was found that relatively large punctures and tears in fuel cells could simply not be sealed without increasing the thickness of the latex layer beyond the point of practicality.

Attempts were made to aid the sealing action of the swelling latex by incorporating a layer of elastic or resilient material, which would tend to elastically or mechanically close over a portion of a large puncture. This served to reduce the size of the puncture and reduced fuel leakage during the period prior to sealing by the swelling latex, but the fire hazard remained serious because of the relatively slow sealing action of the latex.

Another type of self-sealing fuel cell was advanced in the prior art to accomplish the desired rapid sealing. This cell utilized a layer of thermoplastic polymer dissolved in a solvent which was miscible with the fuel. When the cell suffered a puncture, the fuel intruded into the solvent area, the solvent mixed with the fuel, and the solute coagulated and flowed into the wound to form a plug or seal. This fuel cell construction was not completely successful because it was difficult to find solvents of low flammability which would not degrade the properties of the adhesive material holding the cell plies or layers together. Also, where a large puncture was suffered, as by extensive removal of cell material by a tumbling or yawed projectile, the coagulant would flow out relatively rapidly with the escaping fuel. Thus, even though the puncture might eventually be sealed, the sealing or plugging was so slow that too much fuel leaked out prior to plugging. In this regard, the plugging action of latex or raw rubber is preferable since its viscosity and elasticity tend to prevent it from completely flowing out of the wound.

Although the foregoing discussion has been confined to self-sealing fuel cells, there is a comparable lack of satisfactory structure for self-sealing of various other kinds of structures and containers, including fuel hoses, oil tanks, engine transmission housings, and like containers or conduits for flammable fluid. Moreover, there is a general need for self-sealing structure for containing fluids such as water, air, and caustic and toxic chemicals. Vehicle tires, inflatable boats, and pontoon bridges are other examples of structures for which no satisfactory self-sealing structure is presently available.

SUMMARY

According to the present invention, a structure is provided which is particularly adapted for use as a self-sealing fluid barrier in a container or the like. The structure comprises a swellable or expansible sealant material located between inner and outer plies or layers secured together by tension means preferably comprising a plurality of stitches extending between the layers. At least one of the layers is resiliently expansible so that the stitches limit the degree of expansion and enable development of internal pressure upon swelling of the sealant material. In one embodiment the inner layer is deliberately made pervious to the contained fluid, and the sealant material utilized is one characterized by swelling in the presence of the contained fluid. In this arrangement fluid passing through the inner layer swells the sealant material and the internal pressure developed tends to urge the resilient layer outwardly. When a puncture is experienced, the resilient inner layer urges the sealant material into and laterally toward the puncture. Since all of the layer of sealant material is deliberately exposed at all times to the swelling action of the fuel, there are ample quantities of sealant material under pressure available to seal the puncture.

The internal pressure existing in the present structure not only assists in effecting rapid flow of the sealant upon development of a puncture, but prior to a puncture the pressure tends to control the amount of fuel intrusion through the permeable or pervious inner layer. An equilibrium condition is achieved which is destroyed only when a puncture is experienced, further fuel intrusion then being permitted to promote swelling of additional sealant material as the already swelled and softened sealant material moves toward the wound area.

The existence in the present sealing structure of sealant material which is always softened and plasticized to a certain extent, and therefore always capable of flow to effect a seal, means that such self-sealing can be achieved quickly at relatively low temperatures, such as would exist at high altitudes.

An alternative embodiment of the present invention utilizes a structure in which the inner layer or ply is impermeable or impervious to the contained fluid. However, the sealant material selected is one having an initial relatively low viscosity so that it can be injected under pressure between the inner and outer cell layers, but which has a higher viscosity in situ, which is achieved by combining the material and a suitable catalyst or the like prior to such injection. The catalyst or similar agent polymerizes the sealant material to a gum-like state while the injection pressure is maintained. The resilient layer or layers of the structure tend to urge the pressurized sealant material toward any puncture which may develop, as was the case with the first embodiment.

Other objects and features of the invention will become apparent from consideration of the following description taken in connection with the accompanying drawings.

DESCRIPTION OF THE PREFERRED EMBODIMENT

Figure 1:
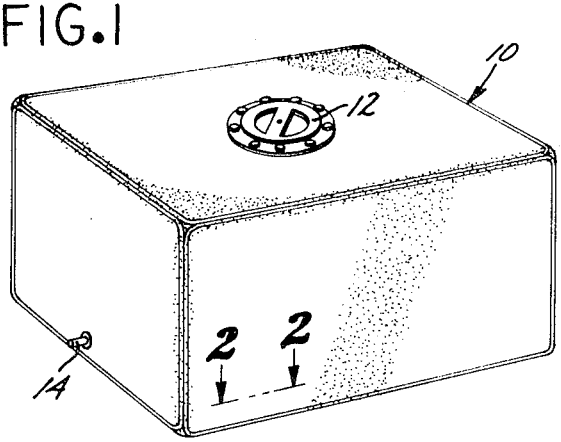
FIG. 1 is a perspective view of an empty fuel cell in which the self-sealing structure of the present invention is utilized to form the walls of the fuel cell.

Referring now to the drawings, there is illustrated a tank, container, or fuel cell 10 whose top, bottom, side, and end walls can be fabricated into any desired configuration. The cell 10 is adapted to contain aviation gasoline or jet fuel and includes a fuel filler opening covered by a cap 12, and also includes an outlet line 14 which is adapted to connect to the fuel system (not shown) associated with the cell 10.

The walls of the fuel cell 10 are flexible so that the cell 10 is generally used in conjunction with some rigid supporting structure (not shown) to give it rigidity. The supporting structure could be the structure to be sealed. That is, if the supporting structure were a transmission housing or similar oil container, the fuel cell 10, or a portion thereof, would be fitted adjacent the section of the housing to be sealed.

The present disclosure concerns use of the present self-sealing structure in a fuel cell 10, but the self-sealing structure is also adapted for use as a liner in a fuel line or conduit, or as a reservoir or in a container for hydrocarbon liquids other than aviation gasoline or jet fuel, such as in an engine transmission housing or the like.

The present self-sealing structure is also useful in containers for other types of fluids, both gaseous and liquid, and an appreciation of this broader application will become apparent once the operation of the present sealing structure is understood.

With reference to FIGS. 2-5, the self-sealing structure is illustrated generally at 16. Although the structure 16 can be made to constitute only one wall or a portion of a wall of the container, the embodiment illustrated is one in which the self-sealing structure 16 extends throughout the top, bottom and sides of the fuel cell 10.

The structure 16 comprises two fabric inner plies or layers 18 which support a layer 20. The layers 18 are impregnated and coated with the same material of which the layer 20 is made. This material is resilient and pervious or permeable to the hydrocarbon fuel 22 with which the fuel cell 10 is intended to be filled. The structure 16 also includes a pair of fabric outer layers 24 which support a layer 26. The layers 24 are impregnated and coated with the same material of which the layer 26 is made. This material is preferably impervious or impermeable to the fuel 22 so as to form a tough, protective outer covering for the cell 10. As will be seen, only one layer 18 and one layer 24 need be used, the extra layer 18 and extra layer 24 being used for additional strength.

A central layer or self-sealing material 28 is disposed between the inner and outer layers 18 and 24, respectively, and is made of raw rubber or latex or other material having the capacity to swell or expand in the presence of the fuel 22.

Tension elements in the form of quilting stitches 30 made of high strength nylon twine or cord or the like and resistant to attack by any of the materials of the structure 16, extend through one of the layers 18, through the self-sealing material 28, and through one of the layers 24. After the stitching is installed, the second layer 18 is bonded to the stitched layer 18 for reinforcement thereof, and the second layer 24 is similarly bonded to the stitched layer 24 for reinforcement.

As will be seen, the stitches 30 are operative to limit the degree of relative movement of the resilient layers 18 and 24 away from each other during the stretching of the layers which occurs upon swelling of the material 28. Such swelling results when the cell 10 is filled with fuel 22, since the fuel 22 passes through the permeable inner layers 18 and 20 and into a portion of the sealing material 28.

Where impact forces of high magnitude are anticipated, it is desirable to use a relatively resilient or elastic material for the stitches 30, such an nylon.

The inner layers 18 and 20 are preferably comprised of high strength textile fabrics made of fibers resistant to the particular solvents or fluids which the cell 10 is to contain, in this case the aviation fuel 22. A suitable fiber for this purpose is one made of synthetic linear polyamides such as, for example, nylon. Other synthetic or natural fibers having the requisite properties may also be used, if desired.

Preferably the fabric of the layers 18 is of sufficiently open weave to permit the fabric to be impregnated with and bonded to the material which forms the layer 20, the impregnated fabric thereby forming a fabric reinforcement. The weave of the fabric and the material of the layer 20 must be such, and must be combined such, that the layers 18 and 20 are pervious or permeable to the fuel 22, as previously indicated. However, such layers must not be pervious to any of the sealing material 28 because any passage of the material 28 into the interior of the fuel cell 10 could possibly contaminate the fuel 22 and would cause the sealant layer to become so diluted as to render it ineffective as a sealant.

The material of the layer 20 impregnating the fabric of the layers 18 is a resilient or elastomeric uncured nitrile rubber, but it could also be a polysulphide rubber, neoprene rubber, buna-N rubber, or any of the well known materials capable of being compounded so as to be permeable to hydrocarbon fuels such as the fuel 22. Suitable materials for this purpose will be immediately apparent to those skilled in the art, since unwanted permeability of materials to fuel has been and continues to be a problem in the construction of fuel cells.

The fabric of the outer layers 24 is similarly constructed of high strength nylon fabric material, just as was described in conjunction with the layers 18. However, the resilient or elastomeric material utilized to form the layer 26 and impregnate the fabric of the layers 24 is preferably a resilient material not permeable to hydrocarbon fuels. Suitable examples of such material, as well as examples of membranes or the like which may be utilized as a fuel barrier, are set forth, for example, in U.S. Pats. Nos. 2,428,527 and 2,973,293. One suitable material is a butadiene-acrylonitrile copolymer available commercially under the name "Hycar" OR–15, the word "Hycar" being a registered trademark. Another often used material is a film of polyamide resin, as is well known to those skilled in the art.

Figure 2:
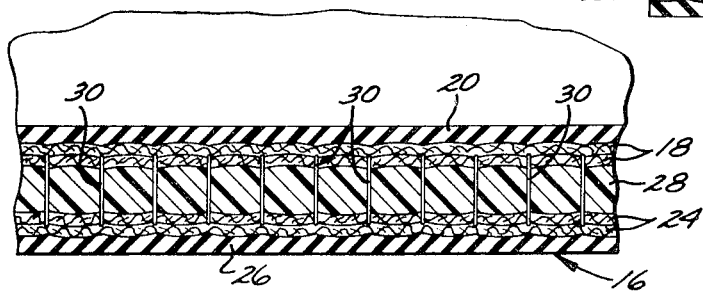
FIG. 2 is an enlarged cross-sectional view of the fuel cell wall taken along the line 2—2 of FIG. 1.
Figure 4:
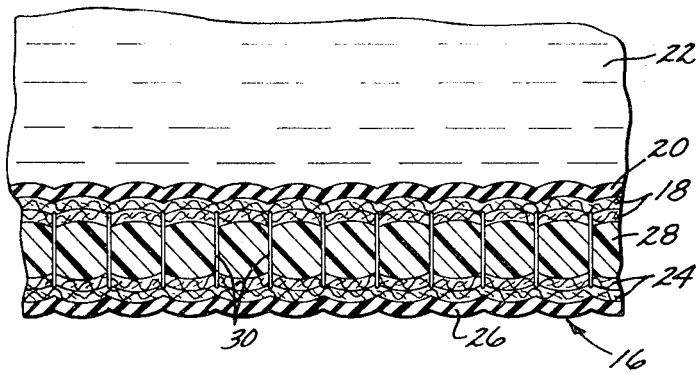
FIG. 4 is a view of the fuel cell of FIG. 2 filled with fuel, and illustrating the swelled condition of the sealant material.

The elastomeric or resilient character of the layers 18 and 20, and preferably also of the layers 24 and 26, enables them to expand outwardly from the positions illustrated in FIG. 2 to the positions illustrated in FIG. 4 upon swelling or expansion of the sealant material 28. As will be seen, this capacity for expansion, and subsequent resilient return to original position upon release of pressure, is important to the development of internal pressure within the space occupied by the sealant material 28. The elasticity of the stitches 30 is also a contributing factor in this regard.

The particular materials utilized to form the plies or layers 20, 18, 24, and 26 form no part of the present invention, since such materials are well known to those skilled in the art. It is important only that at least the inner layers 18 and 20 be resiliently flexible and permeable to the fluid in the cell 10, but impermeable to the sealing material 28; that the layers 24 and 26 form a barrier to exudation of the sealing material 28; and that the various layers provide sufficient structural strength for the particular application. Also, the layers 24 and 26 are preferably impervious to the fuel 22. Thus, the types of materials in the layers need otherwise only be such as may be required to satisfy the particular functional or structural requirements such as burst strength, flexibility, weight, and the like.

The sealant material 28 preferably exists as a layer located in a space between the inner and outer layers of the structure 16, as illustrated, but the material 28 could be incorporated instead in a reinforcing fabric of relatively open weave. However, in layer form the thickness of the material 28 can more easily be varied, according to the particular sealing requirements, and the capacity for flow is better, as compared to flow of the material 28 through the interstices of a fabric within which it might be disposed in the alternative arrangement mentioned.

The sealing material 28 is a raw rubber or gum latex of the type commonly used at present in self-sealing aircraft fuel cells. It could also be an uncured butyl rubber, polybutadiene rubber, or ethylene propylene rubber. Accordingly, the particular composition of the material 28 is not itself a part of the present invention, it being important only that the material 28 be capable of the functions herein described, including a capacity for swelling or expansion in the presence of the fluid in the cell 10, in this case the fuel 22. Uncured material such as gum latex exhibits the desired capacity to be softened or plasticized by aircraft fuel 22 to the point that it is rendered flowable under pressure. As will be seen, the flow is sufficient in a lateral direction, that is, in a direction parallel to the plies or layers of the structure 16, to fill or plug a puncture, but the flow is also sufficiently viscous that the gum latex does not flow out of the puncture. The flow is theorized as not being a flow in the usual sense, but as a stretching of a long chain polymer structure. The stretching thus does not continue indefinitely, and where the gum latex forms a plug in any aperture or wound in the cell 10, the plug portions tend to join and fuse together.

In the construction of the fuel cell 10 which incorporates the self-sealing structure 16, the soft gum latex sealing material 28 is sewn into a continuous guilt between the plies or layers 18 and 24. The spacing between the threads or stitches 30 is a factor in establishing the amount of arching or bulging of the layers 18 and 24 occurring between the quilting stitches 30. Such bulging has the effect of shrinking the size of the cell 10, while also limiting the amount of swelling of the sealing material 28. A spacing of 3/16 of an inch between the stitches 30 has given satisfactory results in this regard. In this regard, it will be apparent that the degree of such bulging is also affected by the number, thickness, and character of the reinforcing layers 18 and 24 which are employed.

Figure 3:
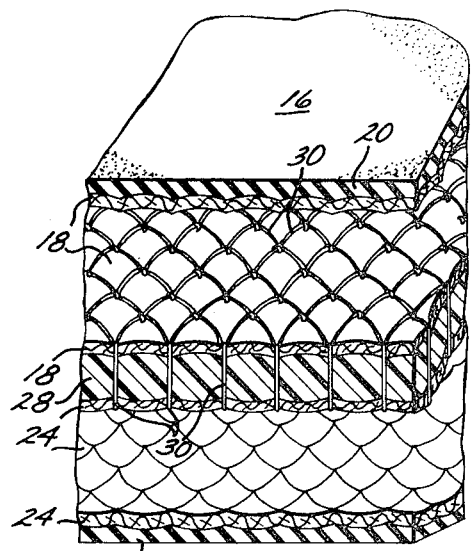
FIG. 3 is an exploded view, in perspective, showing certain of the elements of the self-sealing structure separated for clarity.

Sections of the sealing structure 16 are assembled in a conventional manner to form the container or fuel cell 10, as will be apparent to those skilled in the art. When initially constructed there is an initial slight deformation of the layers 18 and 24 by the quilting stitches 30, as seen in FIGS. 2 and 3. However, after fuel 22 is placed in the cell, the fuel 22 passes through the permeable layers 20 and 18, softens the adjacent portions of the sealing material 28, and causes the material 28 to swell, as shown in FIG. 4. Swelling of the sealing material 28 causes the layers 18, 20, 24 and 26 to swell outwardly of the layer 28 in a very pronounced manner, as evidenced by the multiplicity of bulges at the interstices of the stitches 30.

The interior pressure developed between the layers 18 and 24 by the swelling of the material 28 increases as more and more fuel 22 passes through the layers 18 and 20. Expansion of the material 28 continues to the point where further intrusion or permeation of the layers 18 and 20 by the fuel 22 is prevented by the pressure build-up, and a condition of apparent equilibrium is reached. However, at no time are the pores of the layers 18 and 20 sufficiently large as to permit passage or exudation of the material 28 into the tank interior.

Figure 5:
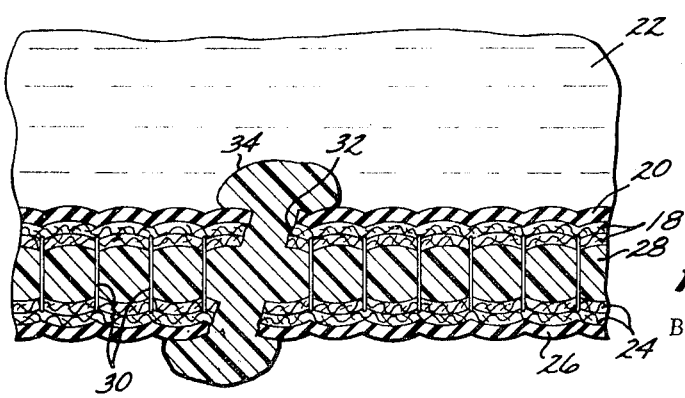
FIG. 5 is a view similar to FIG. 4, but illustrating a puncture in the fuel cell plugged by the swelled sealant material.

At such time as the structure 16 suffers a puncture or wound, as indicated generally at 32 in FIG. 5, the gum latex or material 28 in the immediate vicinity of the puncture 32 flows into the low pressure region of the puncture by virtue of the pressurized condition of the material 28. Since the material 28 is in a pre-softened condition by virtue of the fuel intrusion, the material 28 readily moves toward and into the puncture 32. Moreover, the softened material 28 located remotely of the puncture 32 serves as a reservoir of sealing material capable of lateral flow to replenish that portion of the material 28 which was located immediately about the puncture 32 and which flowed into the puncture 32.

As material 28 moves into the puncture 32, more of the material 28 starts to soften or plasticize. The softening effect of the raw fuel 22 adjacent the aperture 32 prior to plugging thereof is quite great, so that the viscosity of the sealing material 28 in that area is quickly reduced to provide fast sealing. However, it is important to note that with the present sealing structure 16, plugging can be achieved even when no fuel 22 is passing out of the aperture 32. That is, the material 28 is already pre-softened by the described intrusion of the fuel 22 through the layers 18 and 20.

Flow of the material 28 continues until a plug 34 is formed, at which point further flow ceases. The term "flow" is not used in the usual sense since the gum latex or material 28 is a long chain polymer and the action is essentially a stretching thereof until the creep resistance or resistance to stretching is sufficiently high that stretching or "flow" ceases. Consequently, the lateral stretching or flow of the material 28 is highly localized in the area of the puncture 32 and none of the material 28 is actually lost out of the aperture 32. Because of this the structure 16 has readily self-sealed even after experiencing multiple, closely bunched punctures 32. Tests have demonstrated satisfactory sealing of a multiplicity of ¼ inch diameter clean-punched holes spaced approximately ½ inch apart.

In one embodiment of a fuel cell 10 according to the present invention, the thickness of the layers comprising the sealing structure 16 totaled 0.220 inches. When reacted or softened by the fuel 22 the thickness became 0.25 inches. In this fuel cell clean-punched test apertures or wounds 32 were made measuring 5/32, ¼, ⅜ and 7/16 inches in diameter. Complete sealing was achieved in 5 to 15 seconds for the smaller apertures, and up to 6 to 8 minutes for the largest apertures. Identical tests were run on conventional self-sealing fuel cells for comparison and the conventional cells all failed to seal the test apertures.

Another, similarly dimensioned fuel cell 10 constructed in accordance with the present invention was subjected to firing of a 20-gage shotgun at a muzzle velocity of approximately 1,600 feet per second from a range of 20 feet. The resulting punctures were self-sealed in less than 2 seconds.

In yet another test, 50 caliber armor piercing projectiles were fired into a similar fuel cell 10 at velocities ranging from 2,000 to 2,900 feet per second. The character of impacts was both straight-on and tumbled or yawed, and sealing was achieved in less than 2 seconds.

The previously mentioned dimensions of the cell 10 are merely exemplary, and additional structural fabric plies or layers can be added if necessary to satisfy particular crash resistance and ballistic impact requirements. Moreover, the spacing between the stitches 30, and the permeability of the layers 18 and 20 can be adjusted to produce softened material 28 of the desired quantity, viscosity, and internal pressure, as will be apparent. If necessary, deliberate orifices can be made through the layers 18 and 20 to further enhance the softening effect of the fuel 22 upon the material 28.

The number of plies or layers on opposite sides of the layer of material 28 is preferably equal to prevent unbalanced, curling deformation of the structure 16, but an unbalanced construction may be employed if desired.

The pre-softened character of the material 28 makes it capable of flow even where the temperatures are relatively low. Therefore, the present structure 16 is capable of sealing hits suffered at relatively high altitudes. In contrast, the sealing material of prior art fuel cells is quite brittle under these conditions, and is also comparatively resistant to softening by escaping fuel.

As previously indicated, the structure of the present invention also lends itself to self-sealing of containers for fluids other than aviation fuel 22. For example, if the contained fluid is water, self-sealing can be achieved with a material 28 made of polyvinyl alcohol, hydroxy ethyl cellulose, or various aqueous gums, such as gum arabic, or any material which has the capacity to react or combine with water by absorption or otherwise to produce a swelled condition of the material 28. Of course, the layers 18 and 20 between the material 28 and the water would have to be permeable to enable passage of the water into all or a portion of the material 28. Similarly, if the contained fluid is a solvent capable of either softening or dissolving a polymer, for example, that polymer can be used as the material 28. Thus, plasticized polyvinyl chloride could be used as the material 28 for contained solvents such as cyclohexanone and tetrahydrofuran; or butyl acrylate as the material 28 for methyl methacrylate monomer or ethylene chloride. In all of these examples the intruding fluid constitutes the swelling agent which is productive of a pressurized condition of the material 28.

In a related embodiment of the present invention, the structure 16 provides self-sealing for contained fluids, either gases or liquids, which do not constitute the swelling agent for the sealing material 28. This is accomplished by rendering the layers 18 and 20 impermeable to the contained fluid, and injecting a relatively low viscosity material 28, 200 to 500 centipoises for example, between the layers 18 and 24 to form the sealant layer. The pressure of injection was approximately 100 pounds per square inch. This low viscosity material 28 is catalyzed or polymerized, preferably just prior to its injection, and the resulting, polymerized material 28 achieves a higher viscosity, gum-like, pressurized state, much like that of the swelled gum latex material 28 of the embodiment illustrated in FIGS. 4 and 5.

With this arrangement the present structure 16 could be used for pneumatic or other systems where the contained fluid does not effect any swelling or reaction of the sealing material. The arrangement can also be used to provide a fuel cell capable of self-sealing over a wide range of temperature conditions. For example, assuming an aircraft fuel cell for JP–4 jet fuel is expected to operate over a temperature range of –65 to 400 degrees Fahrenheit, the material 28 can be made of unfilled, low viscosity, room temperature curing dimethyl silicone rubber for easy injection between the layers 18 and 24. Such a material is commercially sold as General Electric RTV 615 and is available from the General Electric Company. This is a two component system in which chloroplatinic acid is utilized as the catalyst for cross-linking. Preferably the cross-linking or polymerization is reduced by reducing the amount of the recommended catalyst to produce a partially polymerized material 28 which remains in a gum-like but flowable state over the range of temperatures expected. Such a structure is capable of self-sealing or plugging under conditions which would render self-sealing impossible with existing self-sealing fuel cells.

From the foregoing it will be apparent that a self-sealing structure has been provided which is capable of self-sealing in one of two ways: swelling of the sealing material by passage of the contained fluid through the inner layers separating the contained fluid from the sealing material; or curing of the sealing material in situ and under pressure by a catalyst or similar agent other than the contained fluid. In either case, when the associated container or conduit suffers a puncture or wound, the pressurized, pre-softened sealing material has the capacity for lateral flow into the puncture. Where the contained fluid constitutes the swelling agent, the swelling of the sealing material continues as the fluid contacts the exposed sealing material, thereby further expanding the sealing plug.

Various modifications and changes may be made with regard to the foregoing detailed description without departing from the spirit of the invention.

I claim:

1. Self-sealing structure operative as a barrier to fluid, said structure comprising:
   an inner layer;
   an outer layer impervious to fluid;
   a self-sealing material between said inner and outer layers characterized by a capacity to swell in the presence of a swelling agent, at least one of said layers being resiliently flexible outwardly of said self-sealing material; and
   stitches of material extending between said inner and outer layers and limiting the degree of relative movement of said layers away from each other and thereby to effect self-sealing upon swelling of said self-sealing material.

2. Self-sealing structure according to claim 1 wherein said inner layer constitutes said one of said layers which is resiliently flexible, and wherein said stitches are laterally spaced apart to allow said inner layer to bulge outwardly of said self-sealing material and between said stitches.

3. Self-sealing structure according to claim 1 wherein said inner layer is pervious to fluid.

4. Self-sealing structure according to claim 3 wherein said self-sealing material is adapted to swell in the presence of hydrocarbon fuel.

5. Self-sealing structure according to claim 4 wherein said self-sealing material includes a gum latex composition.

6. Self-sealing structure according to claim 1 wherein both said inner and outer layers are resiliently flexible and substantially equal in strength and resilience whereby said wall structure is resistant to unbalanced curling and bending thereof on said swelling of said self-sealing material.

7. Self-sealing structure according to claim 1 wherein said inner layer is pervious to fluid and impervious to said self-sealing material.

8. Self-sealing structure according to claim 1 wherein said inner layer is impervious to fluid.

9. Self-sealing structure according to claim 1 wherein said self-sealing material comprises a polymerizable material having relatively low viscosity in an uncatalyzed state and a catalyst comprising a swelling agent operative to polymerize said polymerizable material to a flowable, gum-like state.

10. Self-sealing structure according to claim 9 wherein said inner layer is impervious to fluid.

11. Self-sealing structure according to claim 9 wherein said self-sealing material includes dimethyl silicone rubber and said catalyst includes chloroplatinic acid.

12. Self-sealing structure according to claim 7 wherein said self-sealing material is characterized by a capacity to swell in the presence of fluids having swellable properties.

13. Self-sealing structure according to claim 7 wherein said self-sealing material includes a material which swells in the presence of water.

14. Self-sealing structure according to claim 13 wherein said self-sealing material includes a polyvinyl alcohol.

15. Self-sealing structure according to claim 13 wherein said self-sealing material includes hydroxy ethyl cellulose.

16. Self-sealing structure according to claim 13 wherein said self-sealing material includes an acqueous gum.

17. Self-sealing structure according to claim 7 wherein said self-sealing material includes plasticized polyvinyl chloride.

18. Self-sealing structure according to claim 7 wherein said self-sealing material includes butyl acrylate.

19. A laminated wall structure used as a liner for a container for a hydrocarbon liquid, said structure comprising:
   a resilient inner layer pervious to hydrocarbon liquid;
   an outer layer impervious to hydrocarbon liquid;
   a self-sealing material located between said inner and outer layers and having a swelled state responsive to the presence of hydrocarbon liquid; and
   quilt stitching extending between said inner and outer layers and limiting the degree of resilient movement of said inner layer and thereby to effect self-sealing upon swelling of said self-sealing material.

20. A wall structure according to claim 19 wherein said self-sealing material includes a gum latex composition.

21. A wall structure according to claim 19 wherein said self-sealing material includes uncured butyl rubber.

22. A wall structure according to claim 19 wherein said self-sealing material includes polybutadiene rubber.

23. A wall structure according to claim 19 wherein said self-sealing material includes ethylene propylene rubber.

* * * * *